May 23, 1933.　　　　　W. E. INGHAM　　　　　1,909,964
BOLT CONSTRUCTION
Filed June 4, 1931
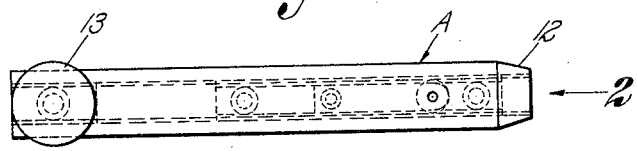
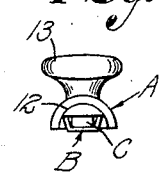
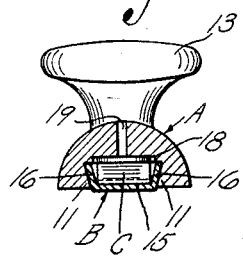
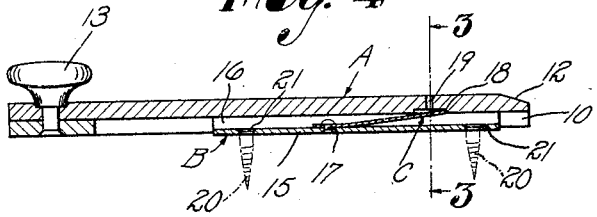
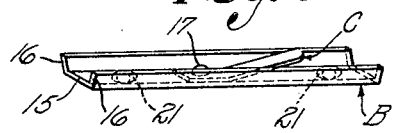
Inventor
Walter E. Ingham
By W. Clay Lindsey,
Attorney Patented May 23, 1933

1,909,964

UNITED STATES PATENT OFFICE

WALTER E. INGHAM, OF NEW BRITAIN, CONNECTICUT, ASSIGNOR TO THE STANLEY WORKS, OF NEW BRITAIN, CONNECTICUT, A CORPORATION OF CONNECTICUT

BOLT CONSTRUCTION

Application filed June 4, 1931. Serial No. 541,987.

This invention relates to bolt constructions of the type having a bolt member adapted to be moved longitudinally into and out of locking engagement with a strike plate or the like, and has particular reference to the means for supporting and guiding the bolt member. Bolts of this sort may be used for various purposes, but find particular adaptation in securing or locking doors, casement windows or the like in closed position.

The aim of the invention is to provide a bolt construction of this sort wherein the means for supporting and guiding the sliding bolt member is entirely concealed by that bolt member so that the construction has a very pleasing and neat appearance.

A further aim of the invention is to provide a construction of this sort which is characterized by its simplicity in arrangement, by its economy in manufacture, and by the ease and facility with which the parts may be assembled.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claim.

In the accompanying drawing, wherein is shown one of the many embodiments which the present invention may take:

Figure 1 is a front view of the bolt;

Fig. 2 is an end view, i. e., looking in the direction of the arrow 2 of Fig. 1;

Fig. 3 is a transverse sectional view taken substantially on line 3—3 of Fig. 4;

Fig. 4 is a sectional view taken longitudinally and centrally through the bolt construction; and Fig. 5 is a perspective view of the attaching plate.

Referring to the drawing in detail, A designates generally a sliding bolt member which is here shown as being of the "surface" type. This bolt member is half round in cross section and has, in its rear face, a longitudinally extending groove 10, the side walls of which are undercut so as to provide ribs or gibs 11. In the present instance, the side walls of the groove are inclined away from each other as they extend into the bolt so that the groove is of dovetail shape. This groove extends to the lower or locking end of the bolt and which end is preferably tapered as at 12 so that it may more readily enter the opening in the strike plate which is not shown in the present instance as the construction thereof is old and well-known. The other end of the bolt may be provided with a knob or handle 13.

The attaching plate which supports the bolt for sliding movement comprises a member B having a sliding fit in the groove 10. In the present illustrative disclosure, this attaching plate comprises a strip of metal bent into trough or channel shape so that, in cross section, it corresponds generally to the cross section of the groove 10. More particularly, the attaching plate is shown as having a flat central body portion 15 with the side flanges 16 inclined relative to one another. The depth of the attaching plate is slightly greater than the depth of the groove 10, as shown in Figs. 3 and 4, so that, when the central portion 15 engages against the door or window, the rear face of the bolt will just clear the door or the window. The side flanges or portions 16 of the attaching plate are parallel to and respectively engage the undercut sides of the groove 10.

For the purpose of frictionally holding the bolt in any desired position of adjustment, and particularly in raised or unlocked position, there is provided a spring C suitably connected to the attaching plate and frictionally engaging the bolt. In the present instance, this spring is in the form of a leaf or finger suitably secured to the body portion 15 of the attaching plate as by means of a rivet 17. The free end of the finger is adapted to engage or rub against the bottom of the groove 10. In order to prevent accidental withdrawal of the bolt from the attaching plate, the bolt has, in the bottom of the groove 10, a shoulder 18 against which the free end of the spring is adapted to engage, as shown in Fig. 4. This shoulder is provided by making a round recess in the bottom of the groove. Leading through the bolt and into the recess is a small opening or aperture 19 into which a suitable tool or instrument is adapted to be inserted to depress the spring and thus disengage it from the shoulder 18 when it is desired to entirely remove the bolt from the attaching plate.

To install the bolt construction, the attaching plate or member B is secured in the desired position to the door or other member in any suitable manner as by means of screws 20, the body portion 15 of the plate being provided with countersunk openings 21 to accommodate such screws. Then the bolt is slipped onto the attaching member. It will be observed that, when the parts have been assembled, the attaching means is entirely concealed by the bolt A. In case it is desired to remove the bolt member A from the attaching member B, this may be readily done by moving the bolt to the position shown in Fig. 4 and then inserting a pin through the opening 19 to depress the spring C, whereupon the bolt may be slid from place, that is, to the left referring to Fig. 4.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

In a bolt construction, a sliding bolt member having a longitudinally extending dovetailed groove in its rear face and open at one end, and a sheet metal attaching plate slidably fitting in said groove and supporting said bolt member, said plate comprising inclined side flanges respectively embraced by the undercut walls of said groove and a central portion connecting said flanges and lying wholly beneath said bolt member and having screw openings therein adapted to receive fastening means to secure said plate to a supporting structure.

WALTER E. INGHAM.